US012179108B2

(12) United States Patent
Li

(10) Patent No.: US 12,179,108 B2
(45) Date of Patent: Dec. 31, 2024

(54) ACTION EFFECT DISPLAY METHOD AND APPARATUS, DEVICE, MEDIUM, AND PROGRAM PRODUCT

(71) Applicant: TENCENT TECHNOLOGY (SHENZHEN) COMPANY LIMITED, Shenzhen (CN)

(72) Inventor: Hao Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/452,291

(22) Filed: Aug. 18, 2023

(65) Prior Publication Data
US 2024/0042319 A1  Feb. 8, 2024

Related U.S. Application Data

(63) Continuation of application No. PCT/CN2022/101360, filed on Jun. 27, 2022.

(30) Foreign Application Priority Data

Aug. 18, 2021 (CN) .......................... 202110949685.4

(51) Int. Cl.
*A63F 13/55* (2014.01)
*G06T 9/00* (2006.01)
(Continued)

(52) U.S. Cl.
CPC ................ *A63F 13/55* (2014.09); *G06T 9/00* (2013.01); *G06T 17/00* (2013.01); *G06V 10/761* (2022.01)

(58) Field of Classification Search
CPC ........... A63F 13/55; G06T 9/00; G06T 17/00; G06V 10/76
See application file for complete search history.

(56) References Cited

U.S. PATENT DOCUMENTS 6,735,738 B1 * 5/2004 Kojima ................ H04N 9/8063
704/503
6,828,962 B1 * 12/2004 McConkie .............. G06T 19/20
345/419

(Continued)

FOREIGN PATENT DOCUMENTS

CN      108401193 A      8/2018
CN      111145317 A      5/2020

(Continued)

OTHER PUBLICATIONS

League of Legends. Wikipedia.org. Online. Jul. 30, 2021. Accessed via the Internet. Accessed Jan. 11, 2024. <URL: https://en.wikipedia.org/w/index.php?title=League_of_Legends&oldid=1036334434> (Year: 2021).*

(Continued)

*Primary Examiner* — Justin L Myhr
*Assistant Examiner* — Carl V Larsen
(74) *Attorney, Agent, or Firm* — ANOVA LAW GROUP PLLC

(57) ABSTRACT

This application discloses an action effect display method and apparatus, a device, and a medium, and relates to the field of interface interaction. The action effect display method includes displaying a first virtual object, the first virtual object being configured to execute a target action with an action effect; receiving an action execution operation, the action execution operation controlling the first virtual object to execute the target action in an accelerated manner; and playing effect segments in sequence to obtain an adjusted action effect of the target action corresponding to execution speed information, wherein at least two of the effect segments are played according to different adjustment ratios.

15 Claims, 8 Drawing Sheets

(51) Int. Cl.
*G06T 17/00* (2006.01)
*G06V 10/74* (2022.01)

(56) References Cited

U.S. PATENT DOCUMENTS

| | | | | |
|---|---|---|---|---|
| 8,786,610 | B1* | 7/2014 | Pighin | G06T 9/001 345/473 |
| 9,082,229 | B1* | 7/2015 | Scholler | H04N 19/136 |
| 2003/0045334 | A1* | 3/2003 | Hosokawa | A63F 13/10 463/6 |
| 2003/0093790 | A1* | 5/2003 | Logan | G06F 16/7867 348/E7.071 |
| 2004/0204237 | A1 | 10/2004 | Miyagawa et al. | |
| 2006/0073862 | A1* | 4/2006 | Shinoda | A63F 13/42 463/2 |
| 2010/0322310 | A1* | 12/2010 | Deng | H04N 19/87 375/E7.243 |
| 2011/0070953 | A1* | 3/2011 | Konishi | A63F 13/24 463/43 |
| 2012/0021828 | A1 | 1/2012 | Raitt et al. | |
| 2014/0078398 | A1* | 3/2014 | Shenoy | G06T 13/80 348/515 |
| 2014/0213367 | A1* | 7/2014 | Fiedler | A63F 13/34 463/42 |
| 2014/0300610 | A1* | 10/2014 | Mayhew | G06T 13/00 345/473 |
| 2016/0010431 | A1 | 1/2016 | Garr et al. | |
| 2016/0104311 | A1* | 4/2016 | Allyn | G06T 1/20 345/473 |
| 2019/0362402 | A1* | 11/2019 | Oh | G06F 40/284 |
| 2022/0072420 | A1 | 3/2022 | Zhang et al. | |
| 2022/0189094 | A1* | 6/2022 | Zhang | G06V 40/23 |

FOREIGN PATENT DOCUMENTS

| | | |
|---|---|---|
| CN | 111330267 A | 6/2020 |
| CN | 111467798 A | 7/2020 |
| CN | 111494942 A | 8/2020 |
| CN | 111494953 A | 8/2020 |
| CN | 112153462 A | 12/2020 |
| CN | 112546616 A | 3/2021 |
| CN | 113633970 A | 11/2021 |
| JP | 2001137540 A | 5/2001 |
| TW | 201043301 A | 12/2010 |

OTHER PUBLICATIONS

Basic Attack. https://leagueoflegends.fandom.com. Online. Jul. 12, 2021. Accessed via the Internet. Accessed Jan. 11, 2024. <URL: https://leagueoflegends.fandom.com/wiki/Basic_attack?oldid=3309281> (Year: 2021).*

Attack Speed. https://leagueoflegends.fandom.com. Online. Jul. 11, 2021. Accessed via the Internet. Accessed Jan. 11, 2024. <URL: https://leagueoflegends.fandom.com/wiki/Attack_speed?oldid=3308947> (Year: 2021).*

/Dev: On Animating Xayah. https://nexus.leagueoflegends.com. Online. 2017. Accessed via the Internet. Accessed Jan. 11, 2024. <URL: https://nexus.leagueoflegends.com/en-US/2017/05/dev-on-animating-xayah/> (Year: 2017).*

Question about attack speed. https://www.reddit.com/. Online. 2021-01-27. Accessed via the Internent. Accessed 2024-01-11. < URL: https://www.reddit.com/r/leagueoflegends/comments/15ryxq/question_about_attack_speed/> (Year: 2021).*

Effect Stacking. Wiki.guildwars.com. Online. Jul. 17, 2019. Accessed via the Internet. Accessed Apr. 30, 2024. <URL: https://wiki.guildwars.com/index.php?title=Effect_stacking&oldid=2639638> (Year: 2019).*

China National Intellectual Property Administration (CNIPA) Office Action 1 for 202110949685.4 May 29, 2023 18 Pages (including translation).

The World Intellectual Property Organization (WIPO) International Search Report for PCT/CN2022/101360 Sep. 26, 2022 12 Pages (including translation).

Half a lifetime of misty rain and confusion."https://zhuanlan.zhihu.com/ p/267514811?utm_source=wechat_session""Understand and implement the attack speed mechanism in LOL", Oct. 21, 2020 (Oct. 21, 2020).

The Japan Patent Office (JPO) Notice of Reasons for Refusal for Application No. 2023-571534 Oct. 15, 2024 11 Pages (including translation).

* cited by examiner

ACTION EFFECT DISPLAY METHOD AND APPARATUS, DEVICE, MEDIUM, AND PROGRAM PRODUCT

RELATED APPLICATIONS

This application is a continuation application of PCT Application No. PCT/CN2022/101360, filed on Jun. 27, 2022, which claims priority to Chinese Patent Application No. 202110949685.4, entitled "ACTION EFFECT DISPLAY METHOD AND APPARATUS, DEVICE, AND MEDIUM" filed to the China Patent Office on Aug. 18, 2021. The two applications are both incorporated herein by reference in their entirety.

FIELD OF THE TECHNOLOGY

Embodiments of this application relate to the field of interface interaction, in particular to display of action effects.

BACKGROUND OF THE DISCLOSURE

In a game application or certain virtual environment-based applications, players are usually able to control virtual objects to release skills or use props in the virtual environment, and the release of skills is usually accompanied by skill effects shown on an interface.

A change in the attack speed of a skill can be released by the players in the virtual environment, and generally, when the skill is released and the attack speed is changed, the process of the skill effects remains unchanged. For example, when the attack speed is increased, the change in the attack speed is reflected by an increase in an injury value to an enemy caused by a single attack after the release of the skill. However, when the player controls the virtual object to move upon completion of an attack, the skill effect is still in the playing process, resulting in mismatch between a movement of the virtual object and playing of the skill effect.

SUMMARY

Embodiments of this application provide an action effect display method and apparatus, a device, a medium, and a program product, which may improve playing match between an action and a skill effect. The technical solutions are as follows:

One aspect of this application provides an action effect display method. The method includes: displaying a first virtual object, the first virtual object being configured to execute a target action with an action effect; receiving an action execution operation, the action execution operation controlling the first virtual object to execute the target action in an accelerated manner; and playing n effect segments in sequence to obtain an adjusted action effect of the target action corresponding to execution speed information, wherein at least two of the effect segments are played according to different adjustment ratios.

Another aspect of this application provides a computer device. The computer device includes one or more processors and a memory, the memory storing at least one instruction, at least one program, a code set or an instruction set, the at least one instruction, the at least one program, the code set or the instruction set being loaded and executed by the one or more processors to implement the action effect display method described in the above aspect.

Another aspect of this application provides a non-transitory computer-readable storage medium. The storage medium is configured to store a computer program, the computer program being executed to implement the action effect display method described in the above aspect.

In embodiments consistent with the present disclosure, when the action effect is displayed in an accelerated manner based on the execution speed information, the action effect is divided into segments. Segmented acceleration processing is performed based on acceleration emphases corresponding to the different effect segments, so that at least two effect segments in the n effect segments adopt different adjustment ratios during playing speed adjustment. The acceleration ratio of segments to be displayed in an emphasized manner is low, and the acceleration ratio of segments with a weak effect is high, that is, the part with the weak effect is omitted and the part with a strong effect is emphasized, achieving the purpose of emphasis on the display of the part with the strong effect while accelerating display of the action effect. When the target action is executed by the first virtual object in an accelerated manner, the displayed action effect can be accelerated on the premise that a key point of the action effect is displayed in an emphasized manner, so that the display accuracy and efficiency of the action effect relative to the target action are improved.

DESCRIPTION OF EMBODIMENTS

In order to make the objects, technical solutions and advantages of this application clearer, the implementations of this application will be further described in detail below in combination with the accompanying drawings.

Figure 1:
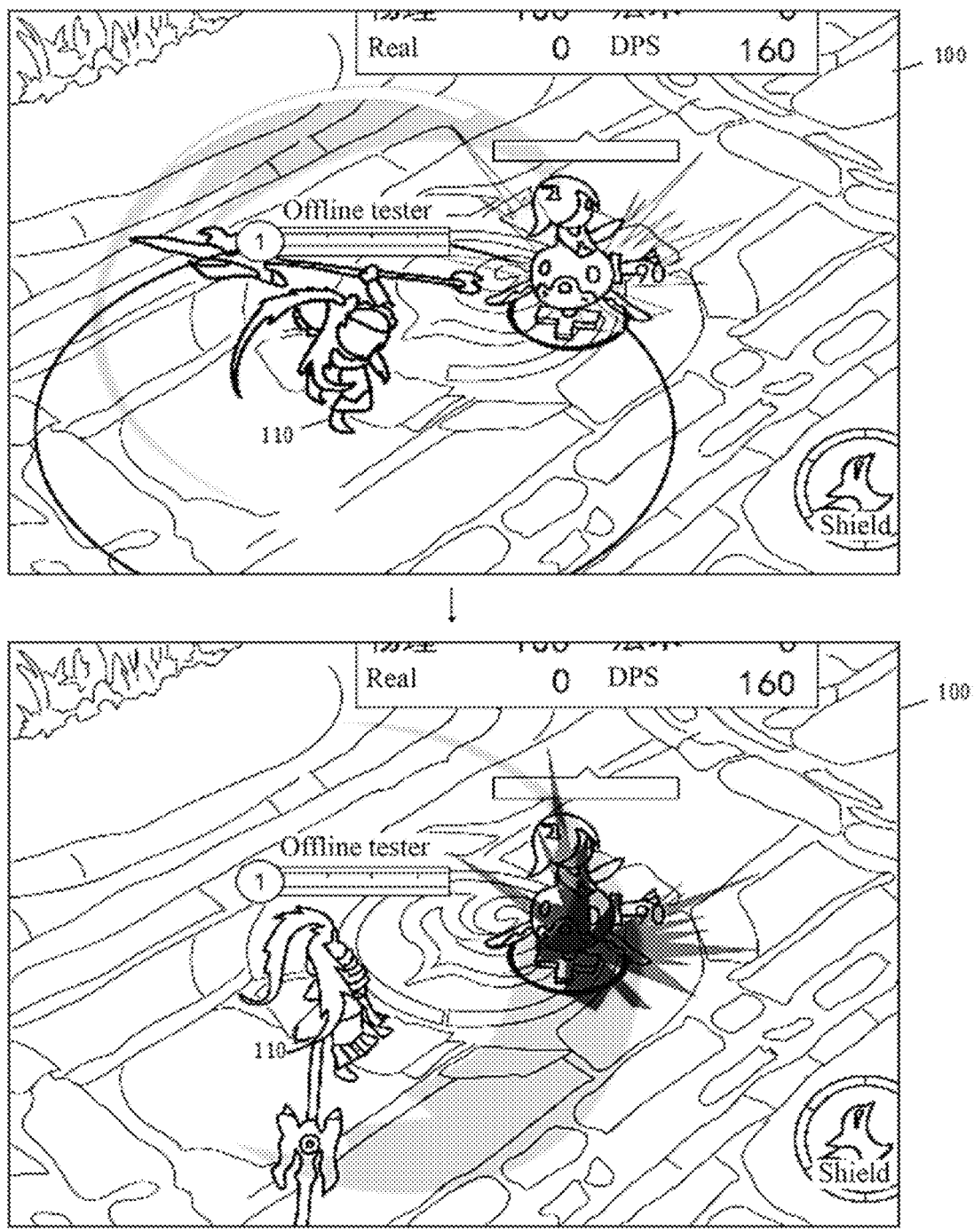
FIG. 1 is a diagram of an action effect display in an implementation environment.

FIG. 1 is a schematic diagram of an interface of a skill effect in the related art. As shown in FIG. 1, a virtual object 110 is displayed in a game interface 100, and the virtual object 110 releases a skill in a virtual environment at a double speed, faster than an initial speed. After completely releasing the skill at the double speed, the virtual object starts to move in the virtual environment, while a skill effect is still played at the original speed, that is to say, when the virtual object starts to move in the virtual environment, the skill effect has not finished playing, resulting in mismatch between the movement of the virtual object and playing of the skill effect.

The terminal in this application may be a desktop computer, a laptop portable computer, a mobile phone, a tablet computer, an e-book reader, a moving picture experts group audio layer III (MP3) player, a moving picture experts group audio layer IV (MP4) player, etc. An application supporting a virtual environment, such as an application supporting a three-dimensional virtual environment, is installed and run in the terminal. The application may be any one of a virtual reality application, a three-dimensional map program, a military simulation program, a third-person shooting (TPS) game, a first-person shooting (FPS) game, a multiplayer online battle arena (MOBA) game. In some embodiments, the application may be a stand-alone application, such as a stand-alone three-dimensional game program, or a network online application.

Figure 2:
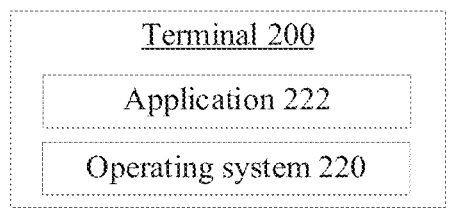
FIG. 2 is a structural block diagram of a terminal according to an embodiment of this application.

FIG. 2 illustrates a structural block diagram of an electronic device according to an embodiment of this application. The electronic device 200 includes: an operating system 220 and an application 222.

The operating system 220 is basic software that provides application 222 with a secure access to computer hardware.

Application 222 is an application supporting a virtual environment. In some embodiments, application 222 is an application supporting a three-dimensional virtual environment. The application 222 may be any one of the virtual reality application, the three-dimensional map program, the military simulation program, the TPS game, the FPS game, the MOBA game, and a multiplayer gun-battle survival game. Application 222 may be a stand-alone application, such as a stand-alone three-dimensional game application, or may be a network online application.

Figure 3:
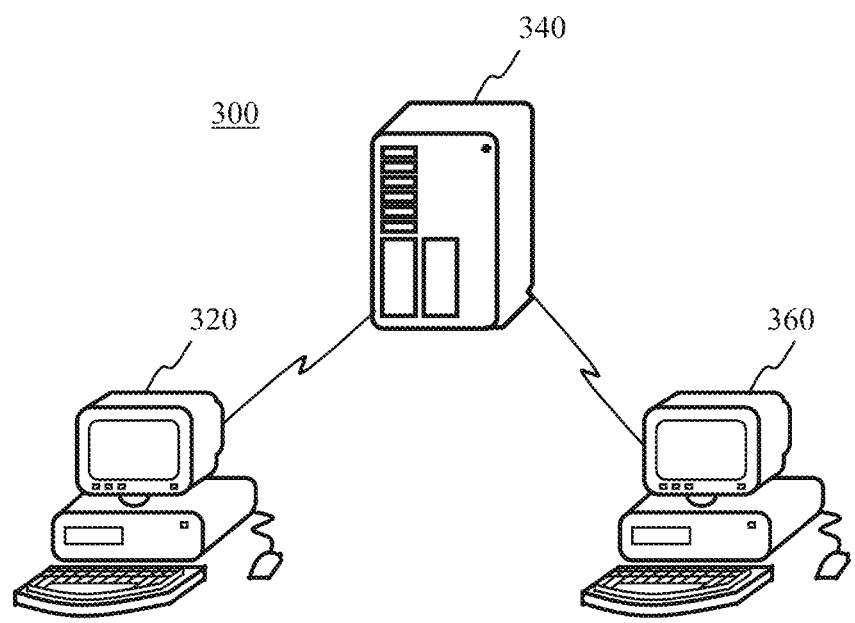
FIG. 3 is a schematic diagram of an implementation environment according to an embodiment of this application.

FIG. 3 illustrates a structural block diagram of a computer system according to an embodiment of this application. The computer system 300 includes: a first device 320, a server 340, and a second device 360.

An application supporting a virtual environment is installed and run on the first device 320. The application may be any one of the virtual reality application, the three-dimensional map program, the military simulation program, the TPS game, the FPS game, the MOBA game, and the multiplayer gun-battle survival game. The first device 320 is a device used by a first user, and the first user uses the first device 320 to control a first virtual object located in a virtual environment to perform an activity. The activity includes but not limited to at least one of adjusting a body posture, crawling, walking, running, riding, jumping, driving, picking up, shooting, attacking, and throwing. For example, the first virtual object is a first virtual character, such as a simulated character or an animated character.

The first device 320 is connected to the server 340 via a wireless network or a wired network.

The server 340 includes at least one of a server, a plurality of servers, a cloud computing platform, and a virtualization center. The server 340 is used for providing a background service for an application supporting a three-dimensional virtual environment. In some embodiments, the server 340 undertakes the primary computing work, and the first device 320 and the second device 360 undertake the secondary computing work. Alternatively, the server 340 undertakes the secondary computing work, and the first device 320 and the second device 360 undertake the primary computing work. Alternatively, the server 340, the first device 320 and the second device 360 use a distributed computing architecture to perform collaborative computing.

An application supporting a virtual environment is installed and run on the second device 360. The application may be any one of the virtual reality application, the three-dimensional map program, the military simulation program, the FPS game, the MOBA game, and the multiplayer gun-battle survival game. The second device 360 is a device used by a second user, and the second user uses the second device 360 to control a second virtual object located in the virtual environment to perform an activity. The activity includes but not limited to: at least one of adjusting a body posture, crawling, walking, running, riding, jumping, driving, picking up, shooting, attacking, and throwing. For example, the second virtual object is a second virtual character, such as a simulated character or an animated character.

In some embodiments, the first virtual character and the second virtual character are in the same virtual environment. In some embodiments, the first virtual character and the second virtual character may belong to the same team, the same organization, have a friend relationship or have a temporary communication right. In some embodiments, the first virtual character and the second virtual character may also belong to different teams, different organizations, or two hostile groups.

In some embodiments, the applications installed on the first device 320 and the second device 360 are the same, or the applications installed on the two devices are the same type of application of different control system platforms. The first device 320 may generally refer to one of a plurality of devices, and the second device 360 may generally refer to one of a plurality of devices. This embodiment is exemplified only by the first device 320 and the second device 360. The device types of the first device 320 and the second device 360 are the same or different. The device types include: at least one game host, a desktop computer, a smartphone, a tablet computer, an e-book reader, an MP3 player, an MP4 player, and a laptop portable computer. The following embodiment is exemplified with the device being a desktop computer.

A person skilled in the art will appreciate that the quantity of the device may be greater or smaller. For example, the quantity of the devices may be one, or tens or hundreds, or more. The quantity and types of devices are not limited by the embodiments of this application.

The server 340 may be implemented as a physical server or a cloud server at a cloud end, where cloud technology refers to a hosting technology for unifying a series of resources, such as hardware, software and networks, in a wide area network or a local area network so as to realize the calculation, storage, processing and sharing of data. The cloud technology is the general name of network technology, information technology, integration technology, management platform technology, application technology, etc. applied based on a cloud computing business model, and may form a resource pool and be used on demand, which is flexible and convenient. Cloud computing technology may become an important support. Background services of a technical network system require a large number of computing and storage resources, such as video websites, picture websites and more portal websites. With the high development and application of the Internet industry, each item may have its own identification mark in the future, which needs to be transmitted to a background system for logical processing. Data of different levels may be processed separately, and all kinds of industry data need a strong system backing support, which may only be realized by cloud computing.

In some embodiments, the method according to some embodiments may be applied to a cloud game scenario, so that the calculation of data logic during a game is completed by a cloud server, while a terminal is responsible for the display of a game interface.

In some embodiments, the server 340 may also be implemented as a node in a blockchain system. Blockchain is a new application mode of computer technology, such as distributed data storage, point-to-point transmission, a consensus mechanism and an encryption algorithm. Blockchain, essentially a decentralized database, is a string of data blocks generated in association using cryptographic methods. Each data block includes information of a batch of network transactions, and is used for verifying (anti-counterfeiting) the validity of the information and generating the next block. Blockchain may include a blockchain underlying platform, a platform product services layer, and an application services layer.

Figure 4:
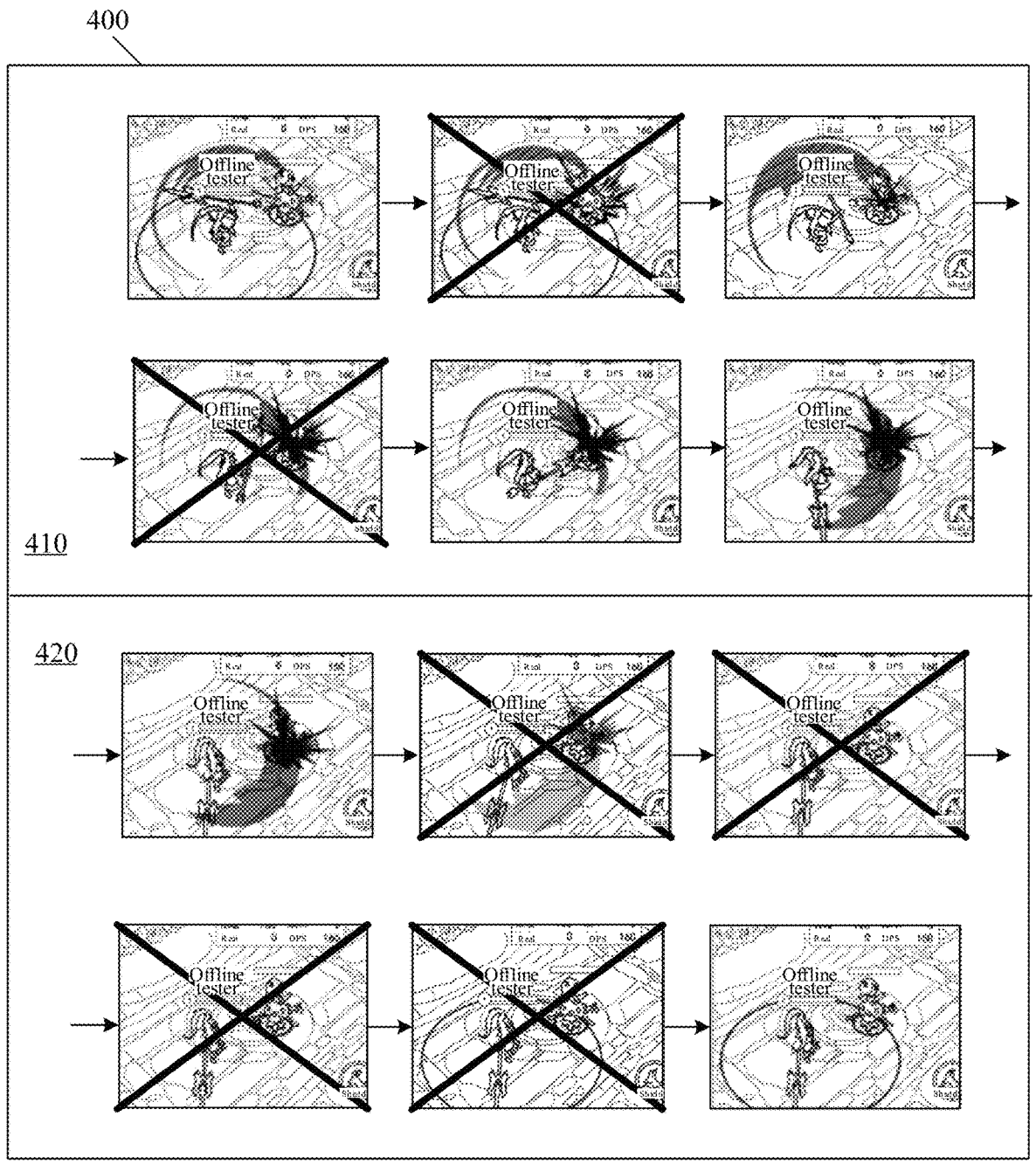
FIG. 4 is a schematic diagram of an action effect display principle according to an embodiment of this application.

In embodiments of this application, with regard to a skill effect, each effect segment is separately accelerated in a segmented form, so as to ensure that an important part of the skill effect is retained, and a negligible part of the skill effect is omitted while accelerating the playing of the skill effect. For example, FIG. 4 illustrates a schematic diagram of an action effect display principle according to an embodiment of this application. As shown in FIG. 4, the skill effect of a target skill 400 includes a total of twelve image frames. When the target skill 400 needs to be released at twice the attack speed, the skill effect of the target skill is correspondingly accelerated.

The twelve image frames corresponding to the skill effect are divided to obtain two effect segments, which are respectively an effect segment 410 and an effect segment 420, each effect segment corresponding to six image frames. When the skill effect is played at a double speed, the two effect segments are respectively compressed based on adjustment ratios corresponding to the two effect segments. Two image frames are deleted from the first effect segment 410 and four image frames are deleted from the second effect segment 420, so that the playing time of the skill effect is shortened by half to correspond to the release duration of the skill.

Figure 5:
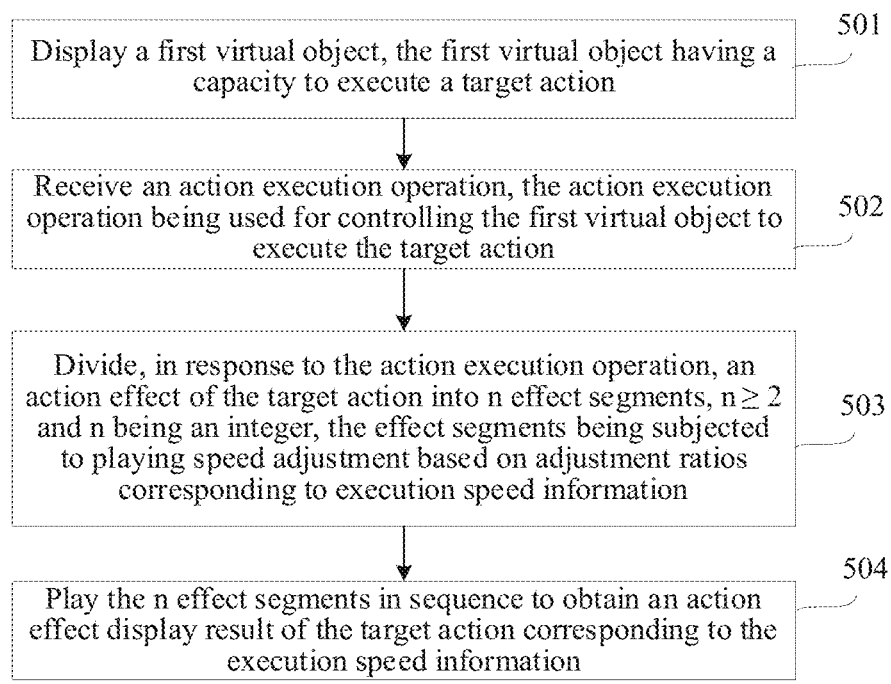
FIG. 5 is a flow diagram of an action effect display method according to an embodiment of this application.

In conjunction with the introduction of the above-mentioned terms and the description of the implementation environment, the action effect display method according to an embodiment of this application is described. FIG. 5 illustrates a flow diagram of an action effect display method according to an embodiment of this application. Taking the method being applied to a terminal as an example for description, as shown in FIG. 5, the method includes the following steps:

Step 501: Display the first virtual object, the first virtual object having a capacity to execute a target action.

The target action includes a corresponding action effect. The target action includes at least one of a target skill action, a target attack action, a target dance action, and a target movement action. In some embodiments, the description will be given by taking the target action being implemented as the target skill action as an example.

Taking an action effect corresponding to the target skill action being a skill effect as an example, when the first virtual object releases a target skill, the target skill action is executed, and the target skill action corresponds to the skill effect.

In some embodiments, the target skill is a skill configured for the first virtual object, and the target skill has a preparation phase and a cooling phase. The preparation phase refers to the fact that the target skill is being prepared and the first virtual object may not release the target skill within a certain period of time in the preparation process. The cooling phase refers to a phase in which the target skill is completely prepared, and the first virtual object may release the target skill.

In some embodiments, when the first virtual object is configured with the target skill and the target skill is in the cooling phase, the first virtual object has the capacity to release the target skill.

The first virtual object releases the target skill to a second virtual object in a hostile relationship in a virtual environment.

In some embodiments, the description will be given by taking the first virtual object being a virtual object hosted by an application installed in the current terminal as an example, that is, a player controls the movement of the first virtual object in the virtual environment and the execution of actions via the application, for example, the player controls the first virtual object to release the target skill to the second virtual object in the virtual environment.

Step 502: Receive an action execution operation, the action execution operation being used for controlling the first virtual object to execute the target action.

The target action corresponds to execution speed information. The execution speed information is used for indicating that the target action is executed by the first virtual object in an accelerated manner.

The execution speed information includes at least one of the following cases:

Firstly, the execution speed information is information determined according to props configured for the first virtual object.

The target action corresponds to initial speed information, and an attack speed is increased on the basis of the initial speed information according to an acceleration prop configured for the first virtual object. For example, the first virtual object is configured with an acceleration ball, and the acceleration ball is used for improving the attack speed of the first virtual object by 20%, that is, the attack speed is increased for a specific skill release (for example, the target skill) or an ordinary attack of the first virtual object, or the attack speed is increased for all skills or ordinary attacks configured for the first virtual object.

Secondly, the execution speed information is speed information determined according to object information of the first virtual object in a virtual battle.

The target action corresponds to the initial speed information, and the attack speed is increased on the basis of the initial speed information according to the level of the first virtual object in the virtual battle. For example, when the first virtual object is in an initial phase of the virtual battle, an attack speed corresponding to a specific skill release (for example, the target skill) or an ordinary attack is an initial attack speed, and each time the first virtual object is improved by five levels, the attack speed corresponding to the specific skill release (for example, the target skill) or the ordinary attack of the first virtual object is increased, with an increase gradient of 20%.

Thirdly, the execution speed information is speed information determined according to the purchase of attack speed attributes by the first virtual object.

The target action corresponds to the initial speed information, and the first virtual object purchases an attack speed attribute in the virtual battle, for example, exchanging for an attack speed of 20% by executing a virtual prop, so that after the first virtual object purchases the attack speed attribute, the attack speed corresponding to a specific skill release (for example, the target skill) or an ordinary attack is 120% of the initial attack speed.

The above-mentioned manner of determining the execution speed information is merely an illustrative example, which is not limited by the embodiments of this application. The manners of prop configuration, object information and the purchase of the attack speed attributes may be used in combination or independently, for example, the highest attack speed is adopted.

Step 503: Divide (e.g., in response to the action execution operation) the action effect of the target action into n effect segments, the effect segments being segments subjected to playing speed adjustment based on adjustment ratios corresponding to the execution speed information, n≥2 and n being an integer. In some embodiments, step 503 (dividing an action effect into n effect segments) may be performed (e.g., by game designer) at game production stage, and steps 501, 502, and 504 may be performed at the game runtime.

At least two of the effect segments adopt different adjustment ratios during the playing speed adjustment.

That is, different effect segments are subjected to playing speed adjustment based on different ratios. That is, some effect segments have a higher playing speed while some effect segments have a slightly lower playing speed on the premise that all effect segments are played in an accelerated manner.

In some embodiments, the action effect of the target action is firstly divided to obtain n candidate effect segments, adjustment ratios respectively corresponding to the n candidate effect segments are determined based on the execution speed information, and the playing speed adjustment is performed on the n candidate effect segments based on the adjustment ratios respectively corresponding to the n candidate effect segments to obtain the n effect segments.

Since the execution speed information may reflect the acceleration situation during execution of the target action, to which degree an original action effect needs to be adjusted may be determined, so that the playing speed of the action effect may match the target action executed in the accelerated manner, and the adjustment accuracy of the playing speed is improved.

In some embodiments, the playing speed adjustment is performed on the n candidate effect segments in at least one of the following manners:

First, acquire, for an $i^{th}$ candidate effect segment, an $i^{th}$ adjustment ratio corresponding to the $i^{th}$ candidate effect segment, 0<i≤n; and compress the quantity of image frames of the $i^{th}$ candidate effect segment based on the $i^{th}$ adjustment ratio to obtain an $i^{th}$ effect segment.

The action effect of the target action includes a total of twelve image frames, the action effect is divided into two candidate effect segments, each effect segment corresponding to six image frames; and a first effect segment is cut to five image frames and a second effect segment is cut to three image frames based on the adjustment ratio, so that the whole action effect is cut to eight image frames.

By compressing the quantity of the image frames, the quantity of image frames included in the $i^{th}$ effect segment is less than the quantity of image frames included in the candidate effect segment, the playing duration of the $i^{th}$ effect segment may be directly shortened due to the smaller quantity of image frames, and the effect of accurately adjusting the playing speed is achieved by controlling the quantity of image frames.

Secondly, acquire, for the $i^{th}$ candidate effect segment, the $i^{th}$ adjustment ratio corresponding to the $i^{th}$ candidate effect segment, 0<i≤n; and adjust a frame rate of the $i^{th}$ candidate effect segment based on the $i^{th}$ adjustment ratio to obtain the $i^{th}$ effect segment.

The action effect of the target action includes a total of twelve image frames, and the initial playing speed of the action effect is twelve frames per second; the action effect is divided into two candidate effect segments, each effect segment corresponding to six image frames; and based on the adjustment ratio, a frame rate of the first effect segment is controlled to be 18 frames per second, and a frame rate of the second effect segment is controlled to be 24 frames per second.

In some embodiments, the action effect of the target action is divided to obtain m candidate effect segments, m>n and m being an integer. The m candidate effect segments are cut to select n candidate effect segments therefrom for playing speed adjustment.

The action effect of the target action is firstly divided to obtain six candidate effect segments, and a sixth candidate effect segment of the six candidate effect segments is deleted, so that five candidate effect segments are obtained, and speed adjustment is performed on the five candidate effect segments subsequently to obtain five effect segments.

In some embodiments, in the displaying process of skill effects, effects displayed first are generally prominent effects, and effects displayed later are ending animations, so that in some embodiments, the adjustment ratios corresponding to the n effect segments are positively correlated with an arrangement order of the n effect segments.

The action effect of the target action includes a total of twelve image frames, and the action effect of the target action is divided into three candidate effect segments for speed adjustment, where the adjustment ratio of the first candidate effect segment is 10%, the adjustment ratio of the second candidate effect segment is 20%, and the adjustment ratio of the third candidate effect segment is 30%.

In some embodiments, the quantity of image frames to be deleted is determined by multiplying the adjustment ratio and the original quantity of image frames of a candidate effect segment and removing the remainder. Alternatively, the quantity of image frames to be deleted is determined by multiplying the adjustment ratio and the original quantity of image frames of a candidate effect segment and rounding the remainder.

In some embodiments, the division quantity of effect segments is preset, or randomly determined, or determined based on a total duration of the effect action.

Step 504: Play the n effect segments in sequence to obtain an action effect display result of the target action corresponding to the execution speed information.

In some embodiments, after the n effect segments subjected to the playing speed adjustment are determined, the n effect segments are played in sequence to serve as the action effect of the target action corresponding to the execution speed information.

In some embodiments, based on the above different manners for speed adjustment, the effect segments are played in at least one of the following manners:

Firstly, when the speed adjustment is performed on the candidate effect segments by compressing the quantity of the image frames, the image frames in the n effect segments obtained by compressing the quantity of the image frames are displayed one by one, so that the action effect of the target action subjected to speed adjustment corresponding to the execution speed information is obtained.

Secondly, when the speed adjustment is performed on the candidate effect segments by compressing the frame rate, the n effect segments are displayed frame by frame based on the frame rate respectively corresponding to each effect segment. For example, if the frame rate of an effect segment A is 12 frames per second, and the frame rate of an effect segment B is 24 frames per second, when the n effect segments are displayed in sequence, the effect segment A is played firstly at 12 frames per second, and then the effect segment B is played at 24 frames per second, so that the action effect of the target action subjected to speed adjustment corresponding to the execution speed information is obtained.

Thirdly, when the speed adjustment is performed on the candidate effect segments by compressing the quantity of the image frames and the frame rate, during playing of the n effect segments, the image frames with the compressed quantity are displayed one by one based on the frame rate respectively corresponding to each effect segment.

The above-mentioned playing situation of the effect segments is merely a schematic example, which is not limited by the embodiments of this application.

In summary, by means of the action effect display method according to some embodiments, when the action effect is displayed in an accelerated manner based on the execution speed information, the action effect is divided into segments, and segmented acceleration processing is performed based on acceleration emphases corresponding to the different effect segments, so that at least two effect segments in the n effect segments adopt different adjustment ratios during playing speed adjustment. The acceleration ratio of segments to be displayed in a emphasized manner is low, and the acceleration ratio of segments with a weak effect is high, that is, the part with the weak effect is omitted and the part with a strong effect is emphasized. When the target action is executed by the first virtual object in an accelerated manner, the displayed action effect can be accelerated on the premise that a key point of the action effect is displayed in an emphasized manner, so that the purpose of emphasis on the display of the part with the strong effect while accelerating display of the action effect is achieved, and the display accuracy and efficiency of the action effect relative to the target action are improved.

Figure 6:
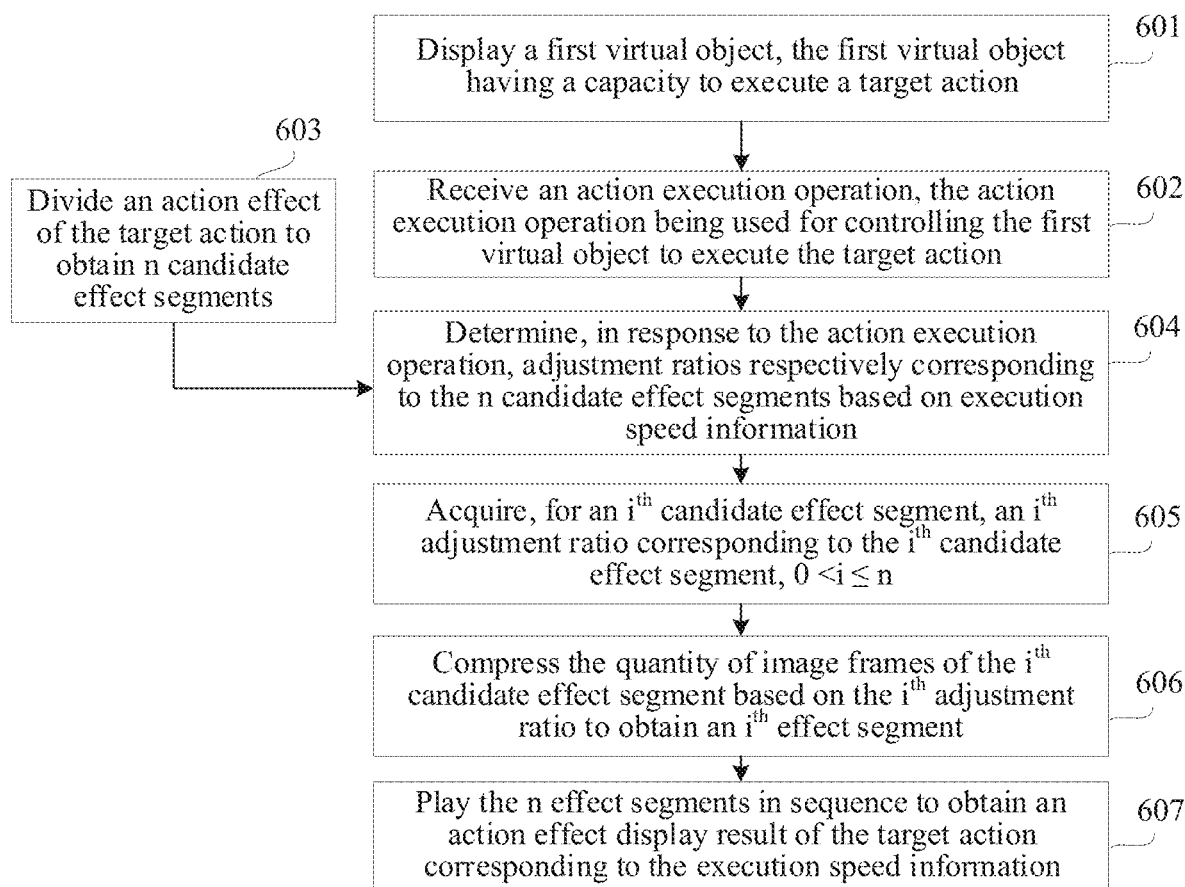
FIG. 6 is a flow diagram of an action effect display method according to another embodiment of this application.

In one embodiment, the candidate effect segments are subjected to speed adjustment by compressing the quantity of the image frames. FIG. 6 is a flow diagram of an action effect display method according to another embodiment of this application. Taking the method being applied to a terminal as an example, as shown in FIG. 6, the method includes the following steps:

Step 601: Display the first virtual object, the first virtual object having a capacity to execute a target action.

The target action includes a corresponding action effect. In some embodiments, the description will be given by taking the target action being implemented as a target skill action as an example.

Taking an action effect corresponding to the target skill action being a skill effect as an example, when the first virtual object releases a target skill, the target skill action is executed, and the target skill action corresponds to the skill effect.

Step 602: Receive an action execution operation, the action execution operation being used for controlling the first virtual object to execute the target action.

The target action corresponds to execution speed information.

Step 603: Divide the action effect of the target action to obtain n candidate effect segments.

In some embodiments, the n candidate effect segments are obtained by directly dividing the action effect of the target action. Alternatively, firstly, the action effect of the target action is divided to obtain m candidate effect segments, where m>n and m is an integer; and the m candidate effect segments are cut to select n candidate effect segments therefrom for playing speed adjustment.

In some embodiments, the m candidate effect segments are cut based on importance parameters of the m candidate effect segments. The importance parameter is a parameter determined based on a preset importance arrangement manner. For example, importance corresponding to the m candidate effect segments obtained by division are arranged from high to low, and thus k candidate effect segments with the lowest importance are deleted to obtain the n candidate effect segments. Alternatively, the importance parameter is a parameter determined by recognition and analysis of an image frame. For example, a result obtained by identifying an action effect display ratio in the image frame is used as the importance parameter, and k candidate effect segments with the lowest importance parameter are deleted to obtain n candidate effect segments, k being a positive integer.

The above-mentioned manner of dividing to obtain the n candidate effect segments is merely an illustrative example, and the manner of cutting the m candidate effect segments is not limited in the embodiments of this application.

In this embodiment, step 603 is performed after step 602. Step 603 may also be performed before step 602 or step 601, and the order of performing step 603 is not limited in this embodiment.

Step 604: Determine, in response to the action execution operation, adjustment ratios respectively corresponding to the n candidate effect segments based on the execution speed information.

In some embodiments, the adjustment ratios respectively corresponding to the n candidate effect segments are determined in at least one of the following manners:

Firstly, the adjustment ratios corresponding to the n candidate effect segments are positively correlated with the arrangement order of the n candidate effect segments, that is, the further a candidate effect segment is arranged, the higher the adjustment ratio corresponding to the candidate effect segment is. Taking shortening the playing duration as an example, the further a candidate effect segment is arranged, the greater the extent to shorten the playing duration is.

Secondly, the adjustment ratios corresponding to the n candidate effect segments are preset. In some embodiments, action effects of different actions have effect focus phases, that is, some action effects focus on an initial phase, while other action effects focus on a middle phase, or some action effects focus on an ending phase. Therefore, different adjustment ratios are set for candidate effect segments based on different action effects, and accordingly emphasized compression is performed on the action effects based on the different adjustment ratios.

Thirdly, the adjustment ratios corresponding to the n candidate effect segments are determined randomly, that is, the n candidate effect segments are compressed in a randomly determined manner.

The above-mentioned manner is merely an illustrative example, which is not limited in this embodiment.

Step 605: Acquire, for an $i^{th}$ candidate effect segment, an $i^{th}$ adjustment ratio corresponding to the $i^{th}$ candidate effect segment, $0<i\le n$.

Among the n candidate effect segments, the $i^{th}$ adjustment ratio of the $i^{th}$ candidate effect segment is acquired, that is, when the value of i is 1 to n, the adjustment ratio of each candidate effect segment is acquired, and subsequent compression processing continues.

Step 606: Compress the quantity of image frames of the $i^{th}$ candidate effect segment based on the $i^{th}$ adjustment ratio to obtain an $i^{th}$ effect segment.

In some embodiments, a first playing duration of the $i^{th}$ candidate effect segment is acquired, the first playing duration is adjusted based on the $i^{th}$ adjustment ratio to obtain a second playing duration, and the quantity of the image frames of the $i^{th}$ candidate effect segment is compressed based on the second playing duration to obtain the $i^{th}$ effect segment.

For example, the first playing duration of the $i^{th}$ candidate effect segment is 2 seconds, corresponding to twelve image frames, and the adjustment ratio of the $i^{th}$ candidate effect segment is 25%, so that a playing duration obtained by adjusting based on the first playing duration and the adjustment ratio is 1.5 seconds, corresponding to nine image frames. That is, the image frames of the $i^{th}$ candidate effect segment are compressed from twelve frames to nine frames.

Alternatively, the quantity of the image frames in the $i^{th}$ candidate effect segment is adjusted by directly acquiring an adjustment ratio corresponding to the $i^{th}$ adjustment ratio, so as to obtain the adjusted quantity of image frames.

Since different playing durations may intuitively correspond to different quantities of image frames under the same frame rate, how to perform compression on the image frames may be accurately indicated based on the determined playing duration, and the compression effect is improved.

In some embodiments, during cutting of image frames in the candidate effect segments, the image frames to be cut are selected in at least one of the following manners:

Firstly, priorities corresponding to the image frames in the $i^{th}$ candidate effect segment are determined, and the quantity of the image frames is compressed based on the priority order of the image frames in the $i^{th}$ candidate effect segment and the $i^{th}$ adjustment ratio to obtain the $i^{th}$ effect segment.

In some embodiments, the priorities of the image frames in the $i^{th}$ candidate effect segment may be determined by ranking, or in a preset manner, or by image recognition.

For example, when the priorities of the image frames in the $i^{th}$ candidate effect segment are determined by ranking, For example, the priorities of the image frames in the $i^{th}$ candidate effect segment are negatively correlated with the order of the image frames, that is, image frames with the lowest ranking in the $i^{th}$ candidate effect segment are preferably deleted.

For example, when the image frames to be deleted in the $i^{th}$ candidate effect segment are determined in the preset manner, taking the case where the priority of the odd frames in the $i^{th}$ candidate effect segment is greater than that of the even frames, and the priority of the odd frames are negatively correlated with the arrangement order as an example, the image frames in the $i^{th}$ candidate effect segment are deleted in sequence in the order of the first frame, the third frame, the fifth frame, and so on.

For example, when the image frames to be deleted from the $i^{th}$ candidate effect segment are determined by image recognition, for example, the image frames are subjected to image recognition to recognize effect contents in the image frames, the proportion of the effect contents in the image frames is positively correlated with the priorities of the image frames, and image frames with the minimum proportion of the effect contents in the image frames are preferably deleted.

Since the priority may reflect the importance degree of the corresponding image frame in the $i^{th}$ candidate effect segment, and the importance degree may be relative to the action effect or image frame deletion, how to delete the image frames during compression of the image frames may be accurately indicated based on the priority of the image frames, and the compression accuracy is improved.

Secondly, the image frames in the $i^{th}$ candidate effect segment are deleted randomly, and the quantity of the image frames is compressed based on the $i^{th}$ adjustment ratio, so as to obtain the $i^{th}$ effect segment.

For example, when the image frames to be deleted from the $i^{th}$ candidate effect segment are determined randomly, a random algorithm is adopted to select image frames from the image frames of the $i^{th}$ candidate effect segment for deletion.

Thirdly, the similarity between the image frames in the $i^{th}$ candidate effect segment is determined, an image frame is randomly reserved from image frames with a similarity greater than a similarity threshold, and the remaining image frames are deleted. For example, 3 frames need to be deleted from the $i^{th}$ candidate effect segment, where the similarity between the 2nd frame, the 3rd frame and the 4th frame is greater than the similarity threshold, then the 3rd frame and the 4th frame are firstly deleted, and one frame continues to be selected and deleted from other image frames with a similarity greater than the similarity threshold.

The above-mentioned manner of deleting the image frames is merely an illustrative example, which is not limited in this embodiment.

Step 607: Play the n effect segments in sequence to obtain an action effect display result of the target action corresponding to the execution speed information.

In some embodiments, after the n effect segments subjected to the playing speed adjustment are determined, the n effect segments are played in sequence to serve as the action effect of the target action corresponding to the execution speed information.

In summary, by means of the action effect display method according to some embodiments, when the action effect is displayed in an accelerated manner based on the execution speed information, the action effect is divided into segments, and segmented acceleration processing is performed based on acceleration emphases corresponding to the different effect segments. The acceleration ratio of segments to be displayed in an emphasized manner is low, while the acceleration ratio of segments with a weak effect is high, that is, the part with the weak effect is omitted and the part with a strong effect is emphasized. Thus, the purpose of emphasis on the display of the part with the strong effect while accelerating display of the action effect is achieved, which improves the display accuracy and efficiency of the action effect.

In the method according to this embodiment, the image frames of the $i^{th}$ candidate effect segment are cut based on the priorities of the image frames in the $i^{th}$ candidate effect segment, so that the accuracy of image frame deletion is improved, and the effect presentation of the $i^{th}$ effect segment is improved.

Figure 7:
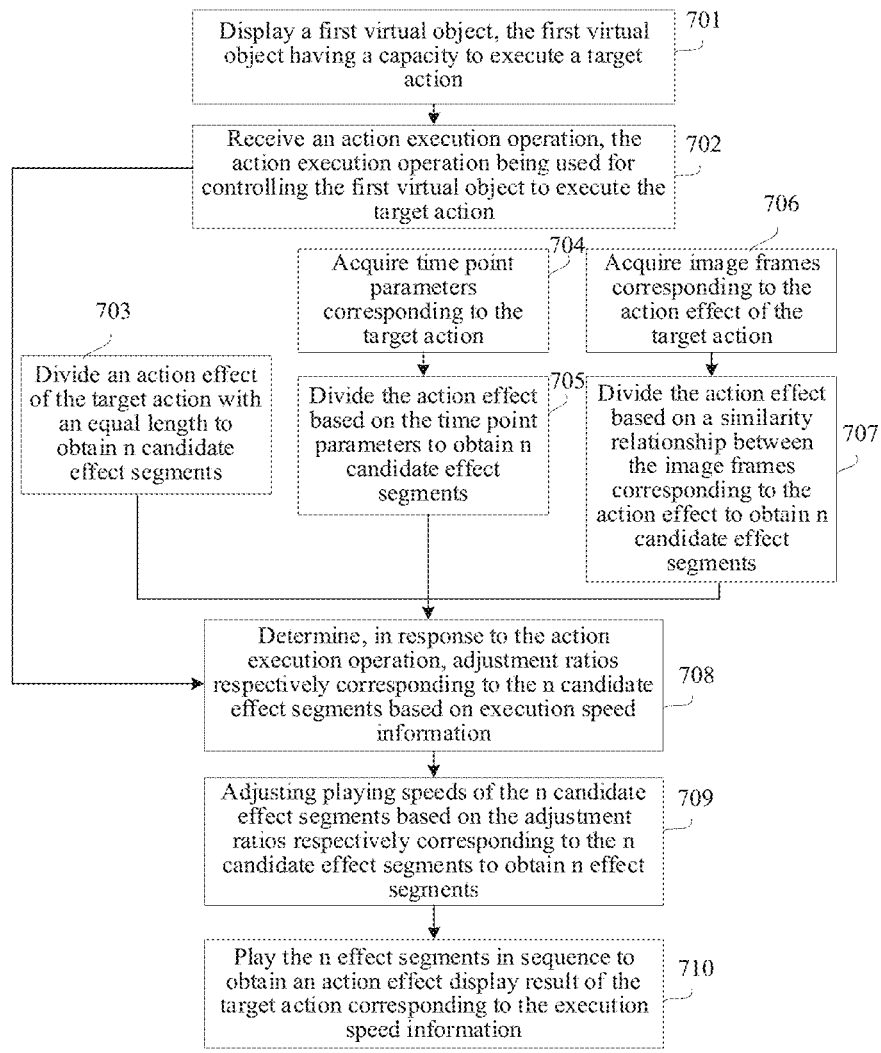
FIG. 7 is a flow diagram of an action effect display method according to yet another embodiment of this application.

In one embodiment, the action effect is divided in various manners. FIG. 7 is a flow diagram of an action effect display method according to an embodiment of this application.

Taking the method being applied to a terminal as an example, as shown in FIG. 7, the method includes the following steps:

Step 701: Display a first virtual object, the first virtual object having a capacity to execute a target action.

The target action includes a corresponding action effect. In some embodiments, the description will be given by taking the target action being implemented as a target skill action as an example.

Taking an action effect corresponding to the target skill action being a skill effect as an example, when the first virtual object releases a target skill, the target skill action is executed, and the target skill action corresponds to the skill effect.

Step 702: Receive an action execution operation, the action execution operation being used for controlling the first virtual object to execute the target action.

The target action corresponds to execution speed information.

Step 703: Divide the action effect of the target action with an equal length to obtain n candidate effect segments.

For example, after the division quantity of the candidate effect segments of the action effect is determined, the action effect of the target action is divided with an equal length based on the division quantity to obtain the n candidate effect segments. With the method of dividing with an equal length, the division of the action effect into segments may be quickly and conveniently completed, and the calculation of division is reduced.

In some embodiments, the division quantity of the candidate effect segments may be preset, for example, when the quantity of candidate effect segments is preset as 2, the action effect of the target action is divided into two candidate effect segments with an equal length.

Alternatively, the division quantity of the candidate effect segments may be determined randomly. In some embodiments, the division quantity of the candidate effect segments is determined within a preset quantity range, for example, within the quantity range of 1-4, the quantity of the candidate effect segments is randomly determined as 2, so the action effect of the target action is divided into two candidate effect segments with an equal length.

Alternatively, the division quantity of the candidate effect segments is determined based on an initial duration of the action effect, that is, the initial duration of the action effect before speed adjustment is determined, and then the division quantity of the candidate effect segments is determined based on the initial duration. For example, the initial duration has a corresponding relationship with the division quantity. For example, when the initial duration is 1-2 seconds, the corresponding division quantity is 2; and when the initial duration is 2-3 seconds, the corresponding division quantity is 3.

Step 704: Acquire time point parameters corresponding to the target action.

In some embodiments, the time point parameters are preset parameters corresponding to the target action.

Step 705: Divide the action effect based on the time point parameters to obtain the n candidate effect segments.

For example, the time point parameters are input for the action effect of the target action, so that the action effect is divided at time points corresponding to the time point parameters to obtain the n candidate effect segments, that is, the quantity of the candidate effect segments corresponds to the quantity of the preset time point parameters. For example, the quantity of the candidate effect segments is the quantity of the time point parameters plus one.

The time points corresponding to division of the candidate effect segments are indicated by the preset time point parameters, for example, a part between two adjacent time points may be taken as a candidate effect segment. In this way, the division of the action effect may be completed quickly, and the division efficiency is improved.

Step 706: Acquire image frames corresponding to the action effect of the target action.

Each image frame of the action effect is acquired for subsequent similarity analysis.

Step 707: Divide the action effect based on a similarity relationship between the image frames corresponding to the action effect, so as to obtain the n candidate effect segments.

In some embodiments, a similarity between two adjacent image frames in the image frames corresponding to the action effect is acquired, and consecutive image frames with a similarity satisfying a similarity threshold are grouped into the same candidate effect segment to obtain the n candidate effect segments.

Similar image frames may be determined from the image frames of an animation effect through the similarity analysis. Since similar image frames most likely correspond to the same sub-effect in the action effect, image frames corresponding to the same sub-effect may be grouped into one candidate effect segment when the candidate effect segments are divided based on this, and the division accuracy is improved.

Step 708: Determine, in response to the action execution operation, adjustment ratios respectively corresponding to the n candidate effect segments based on the execution speed information.

In some embodiments, the adjustment ratios respectively corresponding to the n candidate effect segments are determined by at least one of an arrangement order, a preset manner, and a randomly determined manner.

Step 709: Perform playing speed adjustment on the n candidate effect segments based on the adjustment ratios, respectively, corresponding to the n candidate effect segments to obtain the n effect segments.

In some embodiments, a first playing duration of an $i^{th}$ candidate effect segment is acquired, the first playing duration is adjusted based on the $i^{th}$ adjustment ratio to obtain a second playing duration, and the quantity of image frames of the $i^{th}$ candidate effect segment is compressed based on the second playing duration to obtain an $i^{th}$ effect segment.

Step 710: Play the n effect segments in sequence to obtain an action effect display result of the target action corresponding to the execution speed information.

In some embodiments, after the n effect segments subjected to the playing speed adjustment are determined, the n effect segments are played in sequence to serve as the action effect of the target action corresponding to the execution speed information.

In summary, by means of the action effect display method according to embodiments of this application, when the action effect is displayed in an accelerated manner based on the execution speed information, the action effect is divided into segments, and segmented acceleration processing is performed based on acceleration emphases corresponding to the different effect segments. The acceleration ratio of segments to be displayed in an emphasized manner is low, while the acceleration ratio of segments with a weak effect is high, that is, the part with the weak effect is omitted and the part with a strong effect is emphasized. Thus, the purpose of emphasis on the display of the part with the strong effect while accelerating display of the action effect is achieved, which improves the display accuracy and efficiency of the action effect.

In this embodiment, the image frames of the $i^{th}$ candidate effect segment are cut based on the priorities of the image frames in the $i^{th}$ candidate effect segment, so that the accuracy of image frame deletion is improved and the effect presentation of the $i^{th}$ effect segment is improved.

Figure 8:
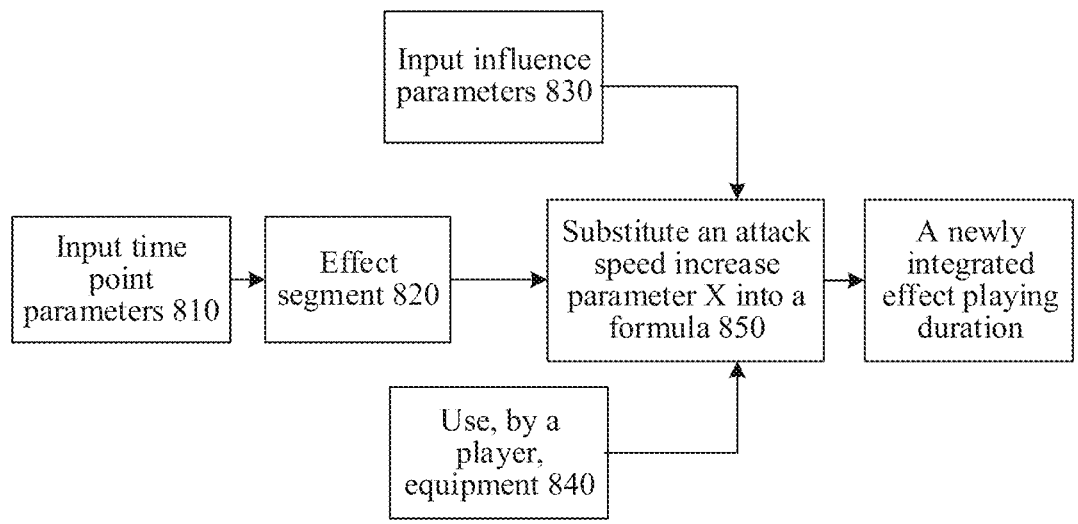
FIG. 8 is a schematic diagram of an attack speed adjustment process according to an embodiment of this application.

For example, taking the attack speed of a skill being increased and a display speed of the skill effect being increased simultaneously as an example, FIG. 8 illustrates a schematic diagram of an attack speed adjustment process according to an embodiment of this application. As shown in FIG. 8, in this process, time point parameters 810 are firstly input for an action effect, and the time point parameters 810 are implemented as $t_1, t_2, \ldots, t_n$. Thus, the skill effect is divided into effect segments 820 based on the time point parameters 810, and effect playing durations corresponding to the effect segments 820 are $T_1, T_2, \ldots, T_n$.

An influence coefficient 830 corresponding to each effect segment 820, i.e., an effect influence coefficient 830 corresponding to a change in the attack speed is input, corresponding to $k_1, k_2, \ldots, k_n$. The degree to which the playing speed of each effect segment is affected by the attack speed is adjusted based on the influence coefficients. In order to realize that the playing speed of front effect segments is less affected by the attack speed and the playing speed of rear effect segments is more affected by the attack speed, generally, $k_1 < k_2 < k_3 < \ldots, < k_n$.

A player may increase an attack speed of a hero by X times by using equipment 840 or adopting other ways, so that the current influenced attack speed is (1+X) times the initial attack speed. The minimum value of X is 0, that is, the attack speed of the hero is increased by 0 without any attack speed bonus. In some embodiments, the attack speed bonus has an upper limit, for example, when the maximum value of X is 2, the attack speed of the hero is at most 3 times the initial attack speed.

By substituting the attack speed increase parameter X into a formula 850, the increased playing speed of the $i^{th}$ effect segment is $V_i=1+k_i+X$, where 1 in the formula is the initial attack speed of the hero, that is, in the initial state, the hero is not subjected to any bonus of equipment or skill effects, and the attack speed is twice the initial attack speed. The attack speed increased by X times is influenced by the coefficient k, so as to adjust the degree to which the different effect segments are influenced by the attack speed.

The playing duration of each effect segment is updated to a newly integrated effect playing duration $$T = \sum_{i=1}^{n} \frac{T_i}{1+k_i X}.$$

Figure 9:
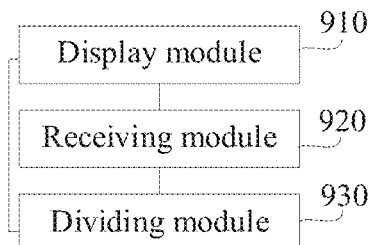
FIG. 9 is a structural block diagram of an action effect display apparatus according to an embodiment of this application.

FIG. 9 is a structural block diagram of an action effect display apparatus according to an embodiment of this application. As shown in FIG. 9, the apparatus includes:

a display module 910, configured to display a first virtual object, the first virtual object having a capacity to execute a target action, the target action including a corresponding action effect;

a receiving module 920, configured to receive an action execution operation, the action execution operation being used for controlling the first virtual object to execute the target action, the target action corresponding to execution speed information, the execution speed information being used for indicating that the target action is executed by the first virtual object in an accelerated manner; and a dividing module 930, configured to divide, in response to the action execution operation, the action effect of the target action into n effect segments, the effect segments being segments subjected to playing speed adjustment based on adjustment ratios corresponding to the execution speed information, at least two of the effect segments adopting different adjustment ratios during the playing speed adjustment, n≥2 and n being an integer.

The display module 910 is further configured to play the n effect segments in sequence to obtain an action effect display result of the target action corresponding to the execution speed information.

In one embodiment, the dividing module 930 is further configured to divide the action effect of the target action to obtain n candidate effect segments.

Figure 10:
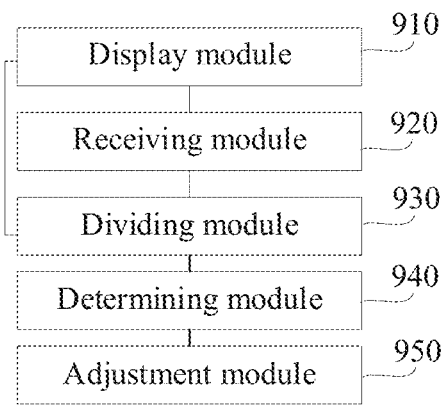
FIG. 10 is a structural block diagram of an action effect display apparatus according to another embodiment of this application.

As shown in FIG. 10, the apparatus further includes:

a determining module 940, configured to determine, in response to the action execution operation, adjustment ratios respectively corresponding to the n candidate effect segments based on the execution speed information; and an adjustment module 950, configured to perform the playing speed adjustment on the n candidate effect segments based on the adjustment ratios respectively corresponding to the n candidate effect segments to obtain the n effect segments.

In one embodiment, the adjustment module 950 is further configured to acquire, for an $i^{th}$ candidate effect segment, an $i^{th}$ adjustment ratio corresponding to the $i^{th}$ candidate effect segment, 0<i≤n; and compress the quantity of image frames of the $i^{th}$ candidate effect segment based on the $i^{th}$ adjustment ratio to obtain an $i^{th}$ effect segment.

In one embodiment, the adjustment module 950 is further configured to acquire a first playing duration of the $i^{th}$ candidate effect segment; adjust the first playing duration based on the $i^{th}$ adjustment ratio to obtain a second playing duration; and compress the quantity of the image frames of the $i^{th}$ candidate effect segment based on the second playing duration to obtain the $i^{th}$ effect segment.

In one embodiment, the determining module 940 is further configured to determine priorities corresponding to the image frames in the $i^{th}$ candidate effect segment; and the adjustment module 950 is further configured to compress the quantity of the image frames based on a priority order of the image frames in the $i^{th}$ candidate effect segment and the $i^{th}$ adjustment ratio to obtain the $i^{th}$ effect segment.

In one embodiment, the adjustment ratios corresponding to the n effect segments are positively correlated with an arrangement order of the n effect segments.

In one embodiment, the dividing module 930 is further configured to divide the action effect of the target action with an equal length to obtain the n candidate effect segments.

In one embodiment, the dividing module 930 is further configured to acquire a time point parameter corresponding to the target action; and divide the action effect based on the time point parameter to obtain the n candidate effect segments.

In one embodiment, the dividing module 930 is further configured to acquire image frames corresponding to the action effect of the target action; and divide the action effect based on a similarity relationship between the image frames corresponding to the action effect to obtain the n candidate effect segments.

In one embodiment, the dividing module 930 is further configured to acquire a similarity between two adjacent image frames of the image frames corresponding to the action effect; and group consecutive image frames with a similarity satisfying a similarity threshold into the same candidate effect segment to obtain the n candidate effect segments.

In summary, by means of the action effect display apparatus according to some embodiments, when the action effect is displayed in an accelerated manner based on the execution speed information, the action effect is divided into segments, and segmented acceleration processing is performed based on acceleration emphases corresponding to the different effect segments, so that at least two effect segments in the n effect segments adopt different adjustment ratios during playing speed adjustment. The acceleration ratio of segments to be displayed in an emphasized manner is low, and the acceleration ratio of segments with a weak effect is high, that is, the part with the weak effect is omitted and the part with a strong effect is emphasized. When the target action is executed by the first virtual object in an accelerated manner, the displayed action effect can be accelerated on the premise that a key point of the action effect is displayed in an emphasized manner, so that the purpose of emphasis on the display of the part with the strong effect while accelerating display of the action effect is achieved, and the display accuracy and efficiency of the action effect relative to the target action are improved.

The action effect display apparatus according to the above-mentioned embodiment is merely exemplified by the division of the above-mentioned various functional modules, and in practical applications, the above-mentioned function may be completed by different functional modules according to needs, that is, the internal structure of the apparatus is divided into different functional modules to complete all or part of the functions described above. In addition, the action effect display apparatus according to the above embodiment belongs to the same concept as the embodiment of the action effect display method, and the specific implementation process thereof is described in detail in the method embodiment, which thus will not be repeated herein.

Figure 11:
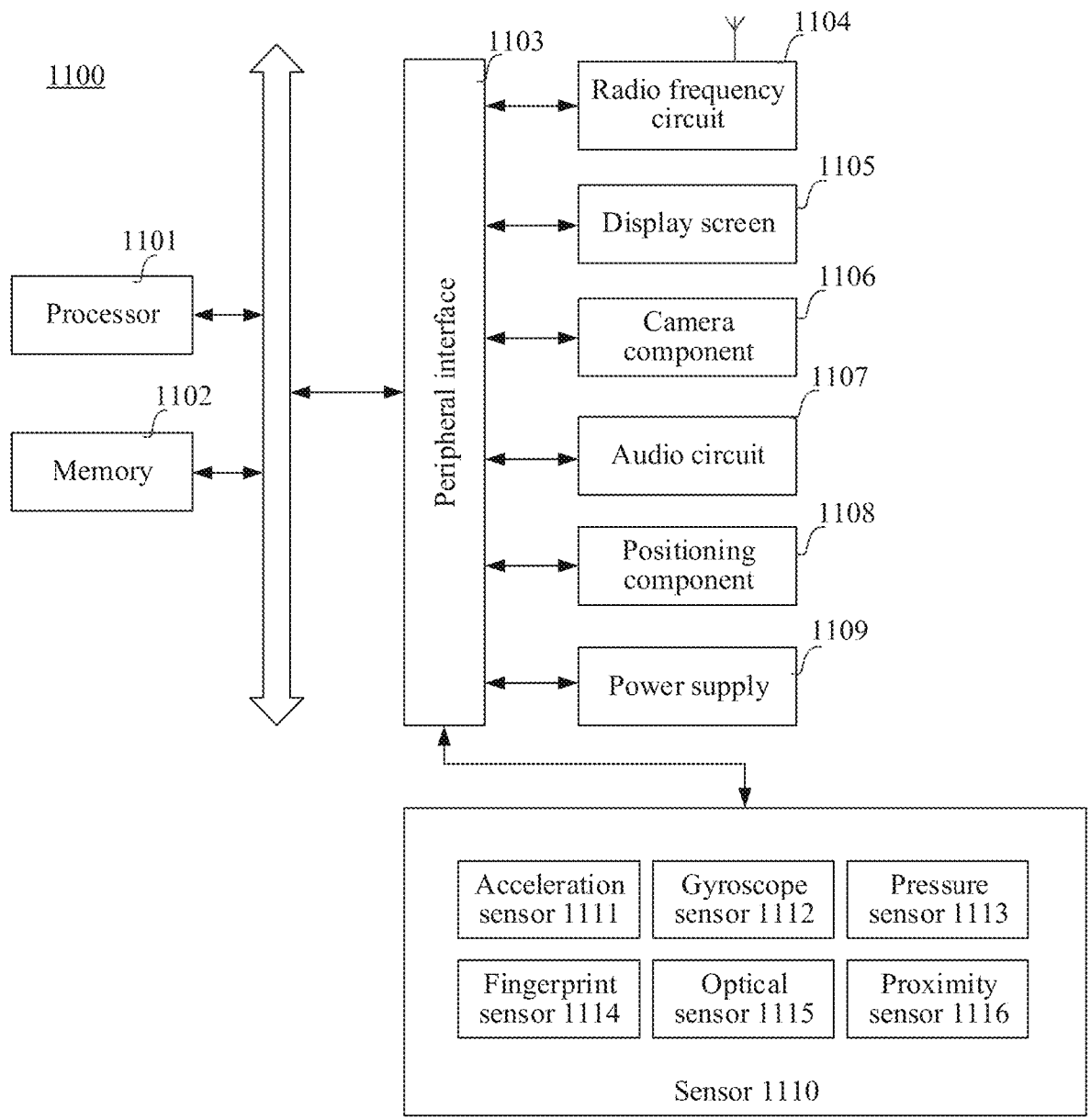
FIG. 11 is a structural block diagram of a terminal according to an embodiment of this application.

FIG. 11 illustrates a structural block diagram of a terminal 1100 according to an embodiment of this application. The terminal 1100 may be: a smartphone, a tablet computer, a moving picture experts group audio layer III (MP3) player, a moving picture experts group audio layer IV (MP4) player, a laptop, or a desktop. The terminal 1100 may also be referred to as user equipment, a portable terminal, a laptop terminal, a desktop terminal, and other names.

Generally, terminal 1100 includes: a processor 1101 and a memory 1102.

The processor 1101 may include one or more processing cores, for example, a 4-core processor or an 8-core processor. The processor 1101 may be implemented in hardware in the form of at least one of digital signal processing (DSP), a field-programmable gate array (FPGA) and a programmable logic array (PLA). Processor 1101 may further include a main processor and a co-processor. The main processor is a processor for processing data in a wake-up state, also referred to as a central processing unit (CPU). The co-processor is a low-power processor for processing data in a standby state. In some embodiments, processor 1101 may be integrated with a graphics processing unit (GPU), and the GPU is responsible for rendering and drawing of contents needing to be displayed by a display screen. In some embodiments, processor 1101 may further include an artificial intelligence (AI) processor, and the AI processor is configured to process computing operations related to machine learning.

Memory 1102 may include one or more computer-readable storage media which may be non-transient. Memory 1102 may further include a high-speed random access memory, and a non-volatile memory, for example, one or more disk storage devices and flash storage devices. In some embodiments, the non-transitory computer-readable storage medium in the memory 1102 is used for storing a computer program which is executed by the processor 1101 to implement the action effect display method according to the method embodiment in this application.

In some embodiments, the terminal 1100 may In some embodiments include: a peripheral interface 1103 and at least one peripheral. The processor 1101, the memory 1102, and the peripheral interface 1103 may be connected by a bus or a signal line. Each peripheral may be connected to the peripheral interface 1103 via a bus, a signal line, or a circuit board. Specifically, the peripherals include: at least one of a radio frequency circuit 1104, a display screen 1105, a camera 1106, an audio circuit 1107, a positioning component 1108, and a power supply 1109.

The peripheral interface 1103 may be used for connecting at least one peripheral related to input/output (I/O) to the processor 1101 and the memory 1102. In some embodiments, processor 1101, the memory 1102, and the peripheral interface 1103 are integrated on the same chip or circuit board. In some other embodiments, any one or two of the processor 1101, the memory 1102, and the peripheral interface 1103 may be implemented on a separate chip or circuit board, which is not limited in this embodiment.

The radio frequency circuit 1104 is used for receiving and transmitting a radio frequency (RF) signal, also referred to as an electromagnetic signal. The radio frequency circuit 1104 communicates with a communication network and other communication devices via the electromagnetic signal. The radio frequency circuit 1104 converts an electrical signal into an electromagnetic signal for transmission, or converts a received electromagnetic signal into an electrical signal. In some embodiments, the radio frequency circuit 1104 includes: an antenna system, an RF transceiver, one or more amplifiers, a tuner, an oscillator, a digital signal processor, a codec chipset, a subscriber identity module card, etc. The radio frequency circuit 1104 may communicate with other terminals via at least one wireless communication protocol. The wireless communication protocols include, but are not limited to: world wide web, metropolitan area networks, Intranet, generations of mobile communication networks (2G, 3G, 4G and 5G), wireless local area networks and/or wireless fidelity (WiFi) networks. In some embodiments, the radio frequency circuit 1104 may further include a circuit related to near field communication (NFC), which is not limited in this application.

The display screen 1105 is used for displaying a user interface (UI). The UI may include a graph, text, an icon, a video, and any combination thereof. When the display screen 1105 is a touch display screen, the display screen 1105 also has the capacity to collect a touch signal at or above the surface of the display screen 1105. The touch signal may be inputted to processor 1101 as a control signal for processing. In this case, the display screen 1105 may also be used to provide virtual buttons and/or virtual keyboards, also referred to as soft buttons and/or soft keyboards. In some embodiments, there may be one display screen 1105 disposed on a front panel of the terminal 1100. In other embodiments, there may be at least two display screens 1105 respectively disposed on different surfaces of the terminal 1100 or in a folded design. In yet other embodiments, the display screen 1105 may be a flexible display screen disposed on a curved or folded surface of terminal 1100. The display screen 1105 may even be further set in a non-rectangular irregular pattern, that is, a special-shaped screen. The display screen 1105 may be made of materials such as a liquid crystal display (LCD) and an organic light-emitting diode (OLED).

Camera component 1106 is used for capturing images or videos. In some embodiments, the camera component 1106 includes a front-facing camera and a rear-facing camera. Generally, the front-facing camera is disposed on the front panel of the terminal, and the rear-facing camera is disposed on the back surface of the terminal. In some embodiments, there are at least two rear-facing cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fused photographing functions. In some embodiments, the camera component 1106 may further include a flash. The flash may be a monochrome temperature flash, or a double color temperature flash. The double color temperature flash refers to a combination of a warm light flash and a cold light flash, and may be used for light compensation at different color temperatures.

The audio circuit 1107 may include a microphone and a speaker. The microphone is used for acquiring sound waves of a user and an environment, and converting the sound waves into an electrical signal which is input to the processor 1101 for processing, or input to the radio frequency circuit 1104 to implement voice communication. For stereo acquisition or noise reduction purposes, there may be a plurality of microphones respectively disposed at different locations of terminal 1100. The microphone may further be an array microphone or an omni-directional acquisition type microphone. The speaker is used for converting the electrical signal from processor 1101 or the radio frequency circuit 1104 into sound waves. The speaker may be a conventional film speaker, or a piezoelectric ceramic speaker. When the speaker is a piezoelectric ceramic speaker, the speaker may not only convert the electric signal into sound waves audible to a human being, but also convert the electric signal into sound waves inaudible to a human being, for ranging and other purposes. In some embodiments, the audio circuit 1107 may also include a headphone jack.

The positioning component 1108 is used for positioning a current geographic position of terminal 1100 to enable navigation or location based service (LBS). The positioning component 1108 may be a positioning component based on the global positioning system (GPS) of the United States, the BeiDou system of China, and the Galileo system of Russia.

The power supply 1109 is used for supplying power to components in terminal 1100. The power supply 1109 may be AC, DC, a disposable battery or a rechargeable battery. When the power supply 1109 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may also be used for fast charging technology.

In some embodiments, the terminal 1100 further includes one or more sensors 1110. The one or more sensors 1110 include, but are not limited to: an acceleration sensor 1111, a gyroscope sensor 1112, a pressure sensor 1113, a fingerprint sensor 1114, an optical sensor 1115, and a proximity sensor 1116.

The acceleration sensor 1111 may detect an acceleration on three coordinate axes of the coordinate system established with terminal 1100. For example, the acceleration sensor 1111 may be configured to detect components of a gravitational acceleration on the three coordinate axes. The processor 1101 may control the touch display screen 1105 to display the user interface in a horizontal view or a vertical view according to a gravity acceleration signal collected by the acceleration sensor 1111. The acceleration sensor 1111 may also be configured to collect action data of a game or a user.

The gyroscope sensor 1112 may detect a body direction and a rotation angle of terminal 1100. The gyroscope sensor 1112 may cooperate with the acceleration sensor 1111 to acquire a 3D action by the user on terminal 1100. Based on the data collected by the gyroscope sensor 1112, the processor 1101 may achieve the following functions: action sensing (such as changing the UI according to a tilting operation of the user), image stabilization during photographing, game control, and inertial navigation.

The pressure sensor 1113 may be disposed on a side bezel of terminal 1100 and/or a lower layer of the touch display screen 1105. When the pressure sensor 1113 is disposed on the side bezel of the terminal 1100, a grip signal of the user to the terminal 1100 may be detected, and the processor 1101 performs left-right hand recognition or quick operation according to the grip signal collected by the pressure sensor 1113. When the pressure sensor 1113 is disposed on the lower layer of the touch display screen 1105, the processor 1101 operates according to the pressure of the user on the touch display screen 1105 to control an operability control on the UI. The operability control includes at least one of a button control, a scroll-bar control, an icon control, and a menu control.

The fingerprint sensor 1114 is used for acquiring a fingerprint of a user, and the processor 1101 identifies an identity of the user based on the fingerprint acquired by the fingerprint sensor 1114, or the fingerprint sensor 1114 identifies the identity of the user based on the acquired fingerprint. When the identity of the user is identified as a trusted identity, the processor 1101 authorizes the user to perform related sensitive operations which include: unlocking a screen, checking encrypted information, downloading software, payment and changing a setting, etc. The fingerprint sensor 1114 may be disposed on the front, back or side of terminal 1100. When a physical button or a vendor logo is disposed on terminal 1100, the fingerprint sensor 1114 may be integrated with the physical button or the vendor logo.

The optical sensor 1115 is used for collecting ambient light intensity.

The proximity sensor 1116, also referred to as a distance sensor, is typically disposed on the front panel of terminal 1100. The proximity sensor 1116 is used for collecting a distance between the user and the front of terminal 1100. In one embodiment, when the proximity sensor 1116 detects that the distance between the user and the front of the terminal 1100 gradually decreases, the processor 1101 controls the touch display screen 1105 to switch from a screen-on state to a screen-off state. When the proximity sensor 1116 detects that the distance between the user and the front of the terminal 1100 gradually increases, the processor 1101 controls the touch display screen 1105 to switch from the screen-off state to the screen-on state.

A person skilled in the art may appreciate that the configuration shown in FIG. 11 is not to be construed as limiting the terminal 1100 and may include more or fewer components than illustrated, or some components may be combined, or a different arrangement of components may be employed.

In some embodiments, the computer-readable storage medium may include: a read only memory (ROM), a random access memory (RAM), a solid state drive (SSD), or a compact disc, etc. The random access memory may include a resistance random access memory (ReRAM) and a dynamic random access memory (DRAM). The serial numbers of the above-mentioned embodiments of this application are merely for the purpose of description and do not indicate the superiority or inferiority of the embodiments.

An embodiment of this application further provides a computer program product including instructions which, when run on a computer, cause the computer to execute the method according to the above-mentioned embodiment.

A person of ordinary skill in the art may appreciate that all or part of the steps of implementing the above embodiments may be completed by hardware, or may be completed by instructing relevant hardware through a program. The program may be stored in a computer-readable storage medium which may be a read only memory, a magnetic disk or a compact disk, etc.

The above are merely optional embodiments of this application and are not intended to limit this application. Any modification, equivalent replacement, improvement, etc. made within the spirit and principle of this application shall fall within the scope of protection of this application.

What is claimed is:

1. An action effect display method, performed by an electronic device, the method comprising:
    displaying a first virtual object, the first virtual object being configured to execute a target action with an action effect;
    receiving an action execution operation, the action execution operation controlling the first virtual object to execute the target action in an accelerated manner, an action effect of the target action comprising n candidate effect segments, n being an integer greater than 1;
    in response to the action execution operation, determining adjustment ratios corresponding to n candidate effect segments based on execution speed information of the target action;
    determining, for an $i^{th}$ candidate effect segment of the n candidate effect segments, a compressed quantity of images frames of the $i^{th}$ candidate effect segment based on an $i^{th}$ adjustment ratio of the adjustment ratios and a priority order of the image frames in the $i^{th}$ candidate effect segment, to obtain an $i^{th}$ effect segment, wherein $0 < i \leq n$; and
    playing n effect segments in sequence to obtain an adjusted action effect of the target action corresponding to the execution speed information, wherein at least two of the effect segments are played according to different adjustment ratios.

2. The method according to claim 1, wherein a first playing duration of the $i^{th}$ candidate effect segment is acquired;
    the first playing duration is adjusted based on the $i^{th}$ adjustment ratio to obtain a second playing duration; and
    the quantity of the image frames of the $i^{th}$ candidate effect segment is compressed based on the second playing duration to obtain the $i^{th}$ effect segment.

3. The method according to claim 1, wherein the adjustment ratios corresponding to the n effect segments are positively correlated with an arrangement order of the n effect segments.

4. The method according to claim 1, wherein the action effect of the target action is divided with an equal length to obtain the n candidate effect segments.

5. The method according to claim 1, wherein a time point parameter corresponding to the target action is acquired; and
    the action effect is divided based on the time point parameter to obtain the n candidate effect segments.

6. The method according to claim 1, wherein image frames corresponding to the action effect of the target action are acquired; and
    the action effect is divided based on a similarity relationship between the image frames corresponding to the action effect to obtain the n candidate effect segments.

7. The method according to claim 6, wherein a similarity between two adjacent image frames of the image frames corresponding to the action effect are acquired; and
    consecutive image frames are grouped with a similarity satisfying a similarity threshold into a same candidate effect segment to obtain the n candidate effect segments.

8. A computer device, comprising one or more processors and a memory, the memory storing at least one instruction, at least one program, a code set or an instruction set, the at least one instruction, the at least one program, the code set or the instruction set being loaded and executed by the one or more processors to implement:
    displaying a first virtual object, the first virtual object being configured to execute a target action with an action effect;
    receiving an action execution operation, the action execution operation controlling the first virtual object to execute the target action in an accelerated manner, an action effect of the target action comprising n candidate effect segments, n being an integer greater than 1;
    in response to the action execution operation, determining adjustment ratios corresponding to n candidate effect segments based on execution speed information of the target action;
    determining, for an $i^{th}$ candidate effect segment of the n candidate effect segments, a compressed quantity of images frames of the $i^{th}$ candidate effect segment based on an $i^{th}$ adjustment ratio of the adjustment ratios and a priority order of the image frames in the $i^{th}$ candidate effect segment, to obtain an $i^{th}$ effect segment, wherein $0 < i \leq n$; and
    playing n effect segments in sequence to obtain an adjusted action effect of the target action corresponding to the execution speed information, wherein at least two of the effect segments are played according to different adjustment ratios.

9. The computer device according to claim 8, wherein a first playing duration of the $i^{th}$ candidate effect segment are acquired;
    the first playing duration is adjusted based on the $i^{th}$ adjustment ratio to obtain a second playing duration; and the quantity of the image frames of the $i^{th}$ candidate effect segment is compressed based on the second playing duration to obtain the $i^{th}$ effect segment.

10. The computer device according to claim 8, wherein the adjustment ratios corresponding to the n effect segments are positively correlated with an arrangement order of the n effect segments.

11. The computer device according to claim 8, wherein the action effect of the target action is divided with an equal length to obtain the n candidate effect segments.

12. The computer device according to claim 8, wherein a time point parameter corresponding to the target action is acquired; and the action effect is divided based on the time point parameter to obtain the n candidate effect segments.

13. The computer device according to claim 8, wherein image frames corresponding to the action effect of the target action are acquired; and the action effect is divided based on a similarity relationship between the image frames corresponding to the action effect to obtain the n candidate effect segments.

14. The computer device according to claim 13, wherein a similarity between two adjacent image frames of the image frames corresponding to the action effect are acquired; and consecutive image frames are grouped with a similarity satisfying a similarity threshold into a same candidate effect segment to obtain the n candidate effect segments.

15. A non-transitory computer-readable storage medium, configured to store a computer program, the computer program being executed to implement:

displaying a first virtual object, the first virtual object being configured to execute a target action with an action effect;

receiving an action execution operation, the action execution operation controlling the first virtual object to execute the target action in an accelerated manner, an action effect of the target action comprising n candidate effect segments, n being an integer greater than 1;

in response to the action execution operation, determining adjustment ratios corresponding to n candidate effect segments based on execution speed information of the target action;

determining, for an $i^{th}$ candidate effect segment of the n candidate effect segments, a compressed quantity of images frames of the $i^{th}$ candidate effect segment based on an $i^{th}$ adjustment ratio of the adjustment ratios and a priority order of the image frames in the $i^{th}$ candidate effect segment, to obtain an $i^{th}$ effect segment, wherein $0<i\leq n$; and playing n effect segments in sequence to obtain an adjusted action effect of the target action corresponding to the execution speed information, wherein at least two of the effect segments are played according to different adjustment ratios.

* * * * *